(12) United States Patent
Yang et al.

(10) Patent No.: US 7,907,572 B2
(45) Date of Patent: Mar. 15, 2011

(54) COLLOCATED RADIO COEXISTENCE METHOD

(75) Inventors: Xue Yang, Portland, OR (US);
Xiangying Yang, Portland, OR (US);
Jing Zhu, Hillsboro, OR (US);
Hsin-Yuo Liu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 795 days.

(21) Appl. No.: 11/863,648

(22) Filed: Sep. 28, 2007

(65) Prior Publication Data

US 2009/0088177 A1    Apr. 2, 2009

(51) Int. Cl.
*H04Q 7/00* (2006.01)

(52) U.S. Cl. ........ 370/332; 370/203; 370/315; 370/329; 370/330; 370/347; 455/452.1; 455/452.2; 455/450; 455/561

(58) Field of Classification Search .................. 370/203, 370/315, 329, 330, 347; 455/452.1, 452.2, 455/450, 561
See application file for complete search history.

(56) References Cited

U.S. PATENT DOCUMENTS

| | | | | |
|---|---|---|---|---|
| 7,602,872 B2* | 10/2009 | Suh et al. | ...... | 375/357 |
| 7,751,368 B2* | 7/2010 | Li et al. | ...... | 370/332 |
| 2006/0116080 A1* | 6/2006 | Eom | ...... | 455/62 |
| 2006/0292988 A1* | 12/2006 | Yuen et al. | ...... | 455/62 |
| 2007/0149249 A1* | 6/2007 | Chen et al. | ...... | 455/561 |
| 2008/0013610 A1* | 1/2008 | Varadarajan et al. | ...... | 375/221 |
| 2008/0051037 A1* | 2/2008 | Molnar et al. | ...... | 455/70 |
| 2008/0063095 A1* | 3/2008 | Khayrallah | ...... | 375/260 |
| 2008/0090575 A1* | 4/2008 | Barak et al. | ...... | 455/444 |
| 2008/0153506 A1* | 6/2008 | Yin et al. | ...... | 455/452.2 |
| 2009/0046674 A1* | 2/2009 | Gao et al. | ...... | 370/337 |
| 2009/0054093 A1* | 2/2009 | Kim et al. | ...... | 455/500 |
| 2010/0202553 A1* | 8/2010 | Kotecha et al. | ...... | 375/267 |

* cited by examiner

*Primary Examiner* — Salman Ahmed
*Assistant Examiner* — Andrew C Lee
(74) *Attorney, Agent, or Firm* — Carrie A. Boone, P.C.

(57) ABSTRACT

A collocated radio coexistence method is disclosed. The method operates in the frequency domain to protect WiMAX downlink traffic from narrow band interference (e.g. harmonics) caused by other collocated radios, such as GSM 800 MHz, operating simultaneously with an 802.16-capable (WiMAX) radio in a multiple radio coexistence platform (MRP).

9 Claims, 4 Drawing Sheets

US 7,907,572 B2

COLLOCATED RADIO COEXISTENCE METHOD

TECHNICAL FIELD

This application relates to WiMAX and, more particularly, to WiMAX communication using multiple-radio devices.

BACKGROUND

The Institute of Electrical and Electronics Engineers (IEEE) has adopted a set of standards for wireless local area networks (LANs), known as 802.11. Wireless products satisfying 802.11a, 802.11b, and 802.11g are currently on the market, for example. Also, an 802.16 standard, known as WiMAX, short for worldwide interoperability for microwave access, has emerged for wireless metropolitan area networks (WMANs).

For these various standards, multiple radio devices are likely to be made available on a single communication platform, such as a laptop, a handheld device, and so on, in the near future. A multiple radio device is known herein as a multi-radio coexistence platform, or MRP. A WiMAX radio is expected to be one important component among the multiple collocated radios in the MRP.

When multiple radios and their antennas are installed in a MRP, due to their very close proximities, these radios, when operated concurrently, may experience radio-to-radio interference. The causes of such interference include the overlapping of the frequency spectrum, out-of-band emissions and harmonics, receiver saturation, and inter-modulation distortion, of the radios. The interference may prevent correct operation of one or more of the collocated radios.

Thus, there is a continuing need for a method by which multiple radios may concurrently operate in an MRP.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a collocated radio coexistence method is disclosed. The method operates in the frequency domain to protect WiMAX downlink traffic from narrow band interference (e.g. harmonics) caused by other collocated radios, such as GSM 800 MHz, operating simultaneously with an 802.16-capable (WiMAX) radio in a multiple radio coexistence platform (MRP).

Figure 1:
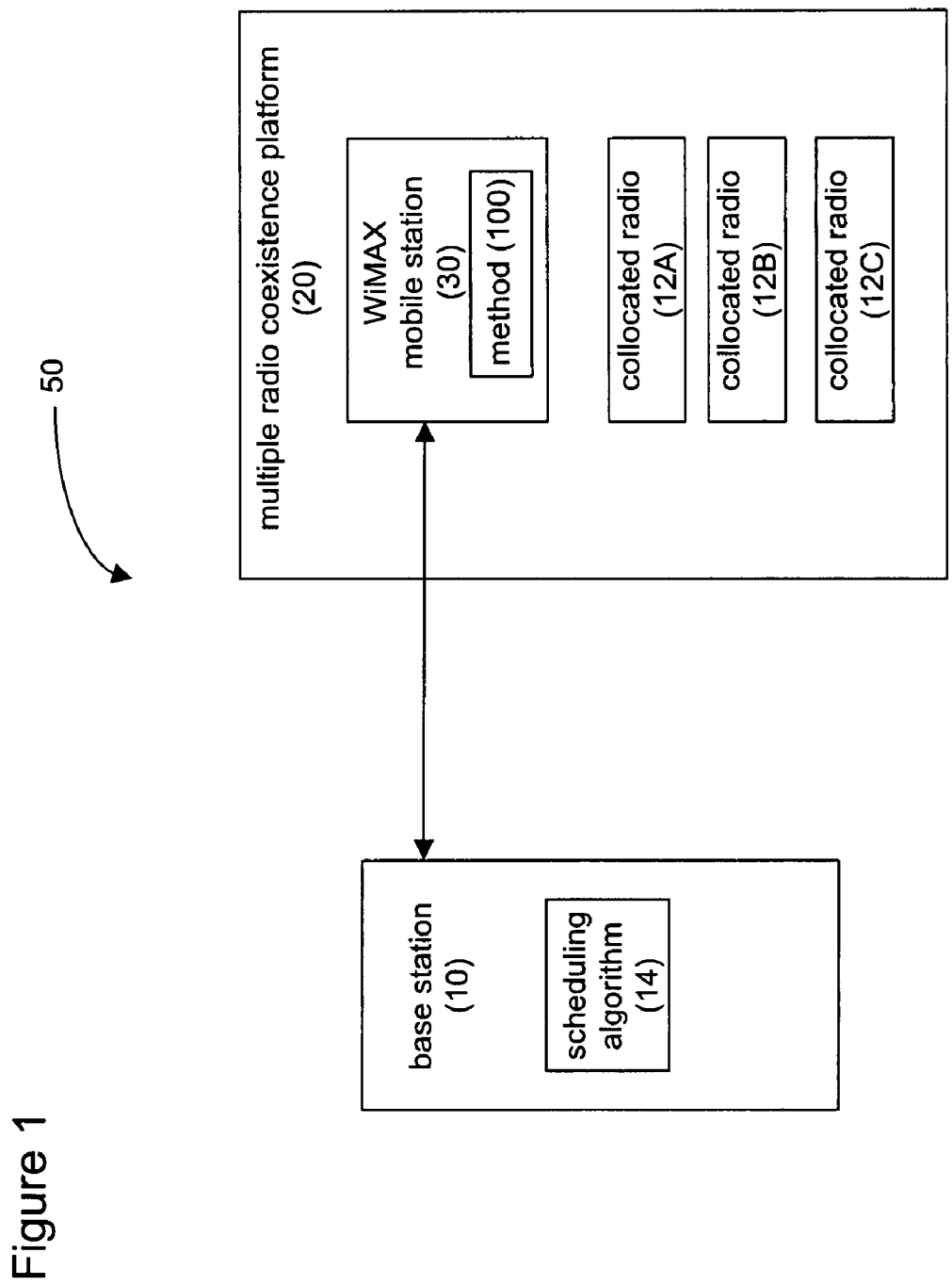
FIG. 1 is a diagram of a wireless neighborhood, including a base station and a multiple radio coexistence platform, according to some embodiments.

FIG. 1 is a block diagram of a wireless neighborhood 50 in which a collocated radio coexistence method 100 is implemented, according to some embodiments. The wireless neighborhood 50 may be a fixed broadband wireless metropolitan-area network (WMAN), including a base station 10 and a multiple-radio coexistence platform (MRP) 20. The MRP 20 includes a WiMAX-capable mobile subscriber or station (MS) 30, as well as three collocated radios 12A, 12B, and 12C (collectively, collocated radios 12). In discussing the collocated radio coexistence method 100, the base station 10 is communicating with the MRP 20, specifically, the 802.16 mobile station 30, and vice-versa.

In WiMAX orthogonal frequency division multiple access (OFDMA) downlink (DL) scheduling, the base station (BS) scheduler obtains channel feedback from a mobile subscriber (MS) to efficiently exploit multi-user diversity and enhance spectral efficiency. Specifically, the base station regularly receives channel quality indicator (CQI) information from the mobile station. Thus, in the wireless neighborhood 50 of FIG. 1, the base station 10 receives CQI information from the MRP 20, with which the base station 10 updates a scheduling algorithm 14. The scheduling algorithm 14 pertains to all subscribers in the wireless neighborhood 50, not just the MRP 20, and determines transmission order, data rate, modulation type, and other characteristics of transmissions by the base station. Since the base station 10 regularly receives CQI information from the various mobile stations in the wireless neighborhood 50, the scheduling algorithm 14 is likewise regularly updated.

In the WiMAX spectrum, there exist two sub-carrier allocations, distributed and adjacent. With distributed (or random) sub-carrier permutations, the sub-carrier allocation is random, with sub-carriers within a sub-channel not necessarily being adjacent. Distributed sub-carrier permutations are generally used for mobile systems. With adjacent sub-carrier permutations, the sub-carrier allocation within each sub-channel consists of adjacent sub-carriers. Adjacent sub-carrier permutations are typically used for fixed, portable, or low-mobility applications.

Under adjacent sub-carrier permutations, the downlink channel quality indicator (CQI) feedback is limited to a few sub-channels, due to the overhead constraint. Thus, a WiMAX mobile station in an MRP may provide CQI feedback for the sub-channels that are not interfered with by the other collocated radios in the MRP.

Figure 2:
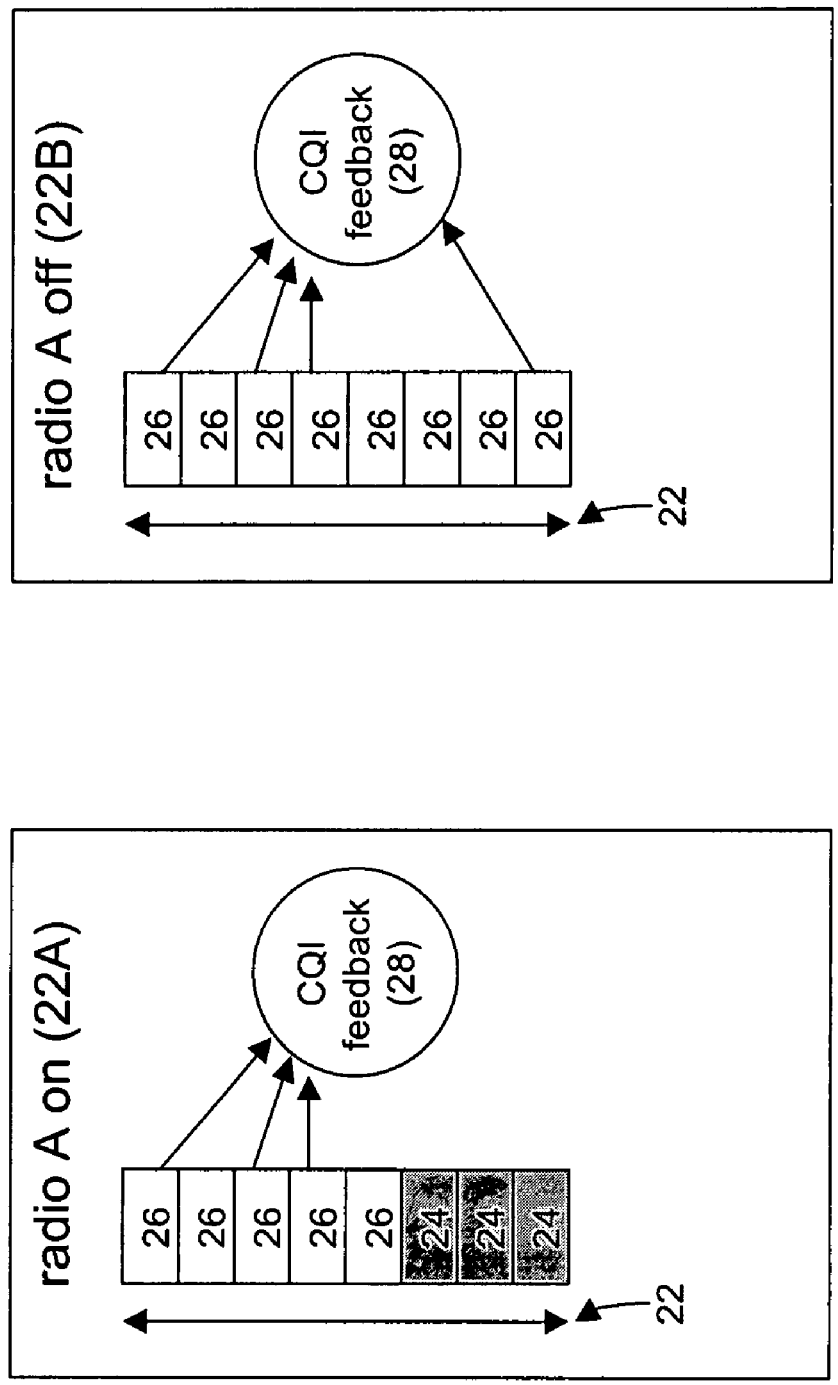
FIG. 2 is a diagram of a WiMAX spectrum including sub-carriers that experience interference due to operation of a collocated radio, according to some embodiments.

This point is illustrated in FIG. 2, according to some embodiments. In the first situation 22A, a radio A is turned on. The radio A is may be, for example, collocated with one or more additional radios (not shown), such as a collocated radio 12 in the MRP 20 (FIG. 1). A WiMAX spectrum 22, allocated to a WiMAX mobile station (not shown), is depicted, with blocks disposed adjacent to the spectrum representing sub-carrier bands. The sub-carrier bands are either un-interfered sub-carrier bands 26 ("clean" sub-carrier bands 26) or interfered sub-carrier bands 24.

When the collocated radio A is active (on) at the MRP (22A), there exists interference (as indicated by the interfered sub-carrier bands 24) of the WiMAX spectrum 22. The clean sub-carrier bands 26 provide CQI feedback 28 (clean sub-carrier band channel quality indicator) to the base station while the interfered sub-carrier bands 26 do not provide CQI feedback. When the collocated radio A is not active (22B), there are no interfered sub-carrier bands 24 in the WiMAX spectrum 22, only clean sub-carrier bands 26. Accordingly, CQI feedback 28 from all the sub-carrier bands 26 of the WiMAX spectrum 22 is provided to the base station.

For correct operation of the collocated WiMAX mobile station, the scheduling algorithm 14 of the WiMAX base station ideally schedules a burst (that is, a communication) for a given mobile station only in the bands with recent CQI feedback. In FIG. 2, when the radio A is on (22A), the WIMAX mobile station would not send CQI feedback 28 for the interfered sub-carrier bands 24 to the base station.

Returning to FIG. 1, according to some embodiments, the WiMAX mobile station 30 includes a collocated radio coexistence method 100, to exploit the CQI feedback mechanism described above. The collocated radio coexistence method 100 allows a WiMAX radio in an MRP to concurrently operate on the portion of the WiMAX spectrum that is not interfered with by the operation of another radio in the MRP. Thus, when the radio A is on (12A), the collocated radio coexistence method 100 enables the WiMAX radio to operate using the non-interfering (clean) sub-carrier bands 26 of the WiMAX spectrum 22. Once the collocated radio A is turned back off (12B), the collocated radio coexistence method 100 enables the WiMAX radio to operate using the entire WiMAX spectrum 22.

The collocated radio coexistence method 100 allows the WiMAX mobile station at the MRP to adaptively choose sub-channels for performing a channel quality indicator (CQI) update, based not only on the received pilot from the base station (BS) but also on the potential activities of other collocated radios in the MRP.

Existing CQI feedback and the corresponding scheduling algorithm are mainly designed for dealing with channel quality variations and are subject to a certain assumption on channel coherence time. On the other hand, interference from collocated radios follows a different pattern than fading channels, and the assumption for fading channels does not pertain to collocated radios in the MRP. Therefore, according to some embodiments, the collocated radio coexistence method 100 enhances the CQI update mechanism such that not only the pilot signal but also the activities of the collocated radios at the MRP are taken into account.

The collocated radio coexistence method 100 assumes that a WiMAX radio that is part of the MRP is aware of whether some other collocated radio is transmitting or not. Such detection may be realized, for example, using either a software or a hardware interface between the collocated radios. This interface may be realizable, since the WiMAX mobile station and the collocated radio(s) are part of the same platform.

Further, the collocated radio coexistence method 100 assumes that the sub-carriers experiencing severe interferences from the collocated radio are known, and are not changing over time. Whenever a collocated radio initiates a transmission, the corresponding frequency bands that may be interfered with are excluded from the WiMAX mobile station CQI feedback, and that they are excluded for a duration, $T_{exclude}$, as explained further, below.

Figure 3:
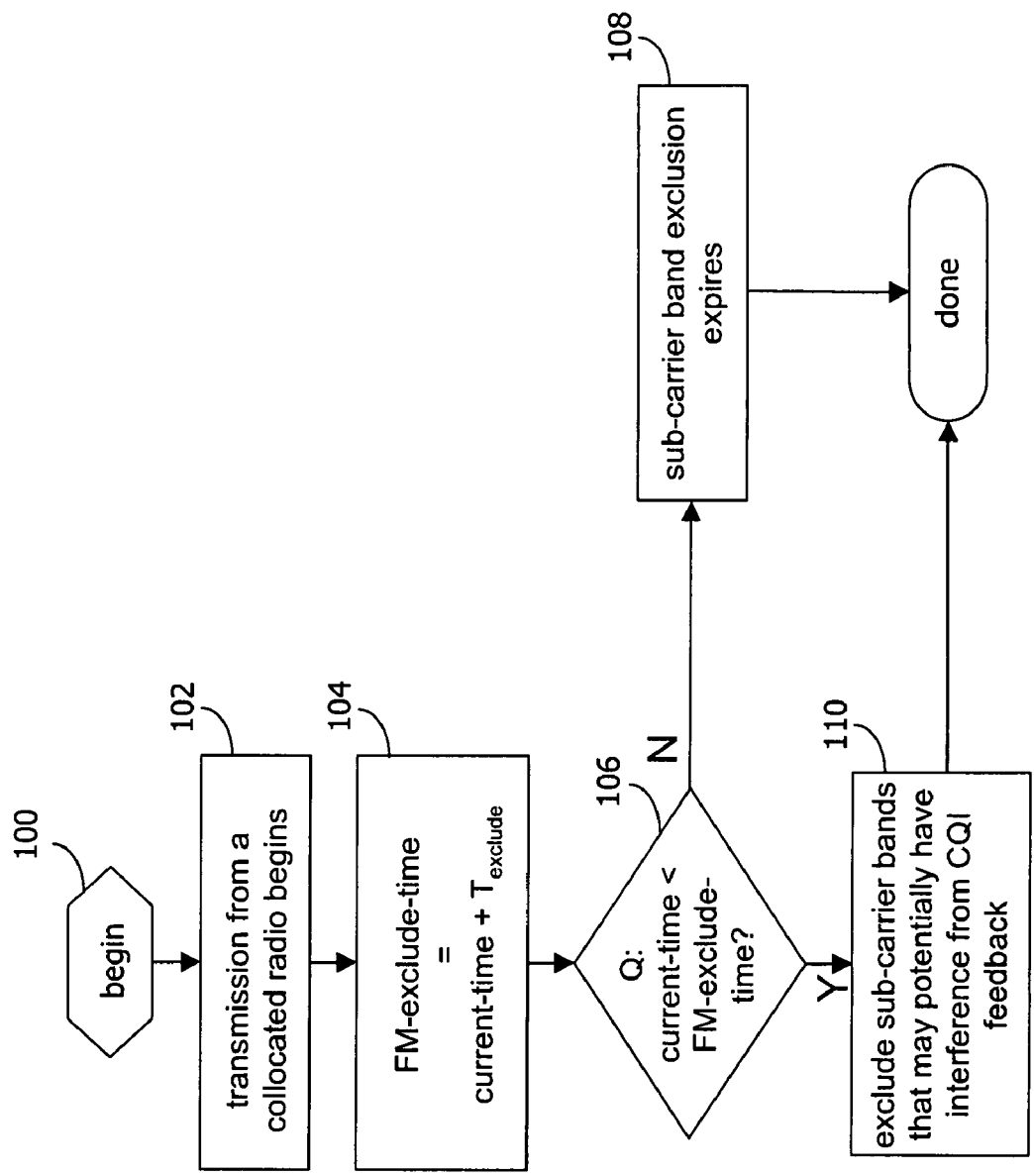
FIG. 3 is a flow diagram of a collocated radio coexistence method, according to some embodiments.

The collocated radio coexistence method 100 is illustration in a flow diagram in FIG. 3, according to some embodiments. As shown in FIG. 1, the method 100 is implemented in the WiMAX mobile station 30 of the MRP 20. The collocated radio coexistence method 100 commences when a transmission from a collocated radio begins (block 102). Any of the radios 12A, 12B, or 12C (FIG. 1) may be candidates. Once this collocated transmission is known, a predetermined time delay, $T_{exclude}$, is added to the current time (block 104). For the duration of this time delay, $T_{exclude}$, CQI feedback from interfering sub-carrier bands 24 to the base station do not take place.

The exclusion deadline is represented in the flow diagram as FM-exclude-time. As long as the time period, $T_{exclude}$, has not elapsed (the "yes" prong of block 106), the interfering sub-carrier band exclusion remains in effect (block 110). Otherwise, the time period, $T_{exclude}$, has elapsed (the "no" prong of block 106), and the interfering sub-carrier band exclusion expires and the mobile station 30 will resume transmitting CQI feedback on these sub-carrier bands to the base station. In some embodiments, the time period, $T_{exclude}$, exceeds the time needed for a typical collocated radio to complete its transmission.

In some embodiments, the collocated radio coexistence method 100 performs frequency-division multiplexing (FDM) at a coarse time granularity. Further, the collocated radio coexistence method 100 does not prevent time-division multiplexing (TDM) from being used, if needed. That is, when certain frequency bands are not excluded from allocation and one or more conflicting operations occur, the TDM mechanism may be used to separate conflicting operations in time. In general, FDM relies on CQI feedback and there is certain delay involved for FDM to take effect. Therefore, it is easier to implement FDM in a coarse time granularity rather than on a per-frame basis. In some embodiments, certain frequency bands are excluded from allocation for the $T_{exclude}$ duration in the collocated radio coexistence method 100, and $T_{exclude}$ is relatively large.

The collocated radio coexistence method 100 is most useful in protecting the downlink operations of the WiMAX radio in the MRP, in some embodiments. The collocated radio coexistence method 100 may be readily applied without any changes to the current WiMAX standard. In other words, no change to the base station needs to be made. Similarly, the collocated radio coexistence method 100 may be extended to schedule WiMAX uplink (UL) transmissions within certain frequency bands to minimize interference to other collocated radios, provided that the WiMAX base station supports the mobile station sub-channel selection for uplink scheduling.

Figure 4A:
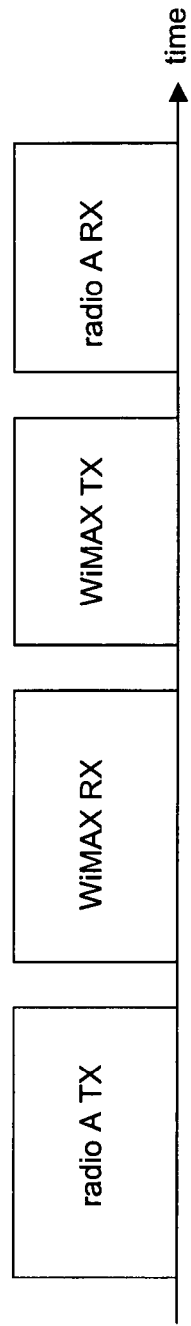
FIG. 4A is a diagram of TDM-based collocated radio coexistence, according to some embodiments.
Figure 4B:
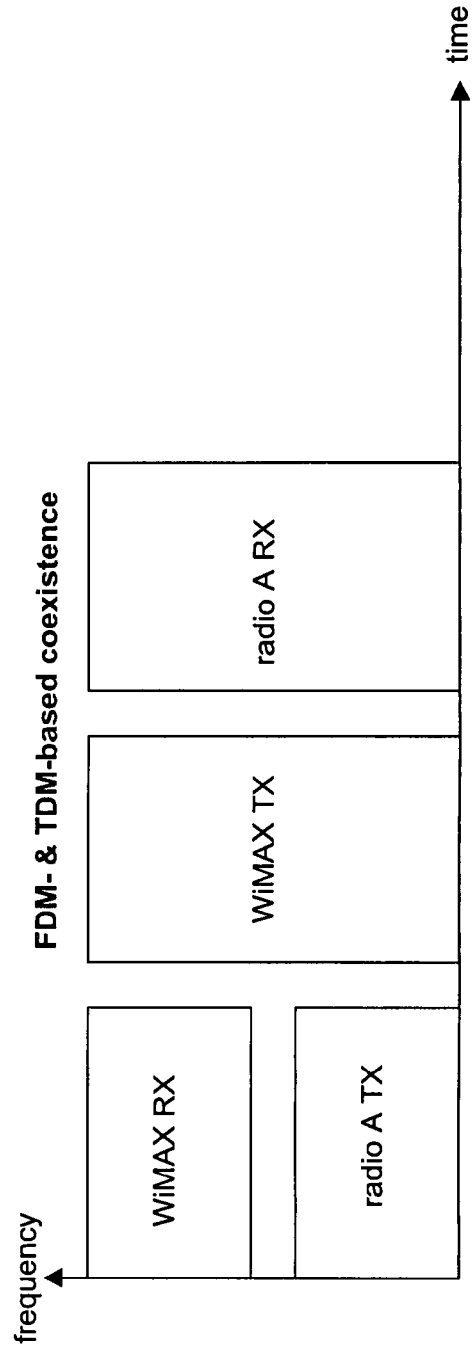
FIG. 4B is a diagram of FDM- and TDM-based coexistence enabled by the collocated radio coexistence method of FIG. 3, according to some embodiments.

FIGS. 4A and 4B illustrate one benefit of using the collocated radio coexistence method 100, in some embodiments. Frequency-division multiplexing adds another control dimension to enable the coexistence of multiple radios in the MRP. Using TDM-type coexistence mechanisms, operations of a WiMAX radio and another radio A may interleave in time only, as shown in FIG. 4A. First, the radio A transmits, then the WiMAX radio receives, then, the WiMAX radio transmits, and finally, the radio A receives.

With the additional support of frequency-division multiplexing, both the radio A and the WiMAX radio may divide their channel use in time, but also may operate concurrently at non-interfering frequency bands using FDM, as illustrated in FIG. 4B. While radio A is transmitting, the WiMAX radio is simultaneously receiving, although not in the same frequency bands. This shows a particular benefit when the WiMAX radio is to receive downlink traffic from the base station. Whether the collocated radio is turned on or not, FIG. 4B shows that the WiMAX radio may receive a transmission from the base station. The remaining operations, WiMAX transmission and radio A reception, may be performed sequentially, as shown.

Thus, the collocated radio coexistence method 100 provides an FDM-based coexistence approach, enabling WiMAX to coexist with other radios within the MRP. FDM may be combined with a TDM-based approach to add more control flexibility. Using an FDM- and a TDM-based coexistence solution, multiple collocated radios within the MRP may not only divide their channel use in time, they may also operate concurrently at non-interfering frequency bands using FDM. Compared with a TDM-only coexistence solution, improvement on spectrum utilization is achieved, in some embodiments.

In some embodiments, the collocated radio coexistence method 100 employed in an MRP improves the platform spectrum utilization and subsequently boosts the performance of multiple radios within the MRP. Further, the collocated radio coexistence method 100 may be used transparently without the WiMAX base station having any awareness of the method.

When only part of the WiMAX spectrum is subject to severe interference from other collocated MRP radio operations, the collocated radio coexistence method 100 exploits the adjacent sub-carrier permutation supported by the WiMAX standard to enable frequency-division multiplexing among multiple collocated radios at the MRP.

While the application has been described with respect to a limited number of embodiments, those skilled in the art will appreciate numerous modifications and variations therefrom. It is intended that the appended claims cover all such modifications and variations as fall within the true spirit and scope of the above description.

We claim:

1. A method, comprising:
    transmitting a first channel quality indicator (CQI) of a first sub-carrier band by a mobile subscriber to a base station, the mobile subscriber being part of a multiple radio coexistence platform;
    transmitting a second CQI of a second sub-carrier band by the mobile subscriber to the base station;
    identifying transmission from a collocated radio in the multiple radio coexistence platform, wherein the collocated radio transmission causes interference in the second sub-carrier band;
    not transmitting a next CQI of the second sub-carrier band by the mobile subscriber to the base station for a predetermined time period, wherein the predetermined time period exceeds a time for the collocated radio transmission to complete; and
    transmitting a next CQI of the first sub-carrier band by the mobile subscriber to the base station;
    wherein the mobile subscriber receives transmissions in the first sub-carrier band during the predetermined time period.

2. The method of claim 1, further comprising:
    determining that the predetermined time period has expired; and
    transmitting a next CQI of the second sub-carrier band by the mobile subscriber to the base station.

3. The method of claim 2, wherein the transmission by the collocated radio and the reception by the mobile subscriber occur simultaneously.

4. A method, comprising:
    transmitting channel quality indicators for sub-carrier bands in a frequency spectrum to a base station by a mobile subscriber in a mobile radio coexistence platform;
    receiving an indication that a collocated radio is turned on;
    identifying one or more of the sub-carrier bands as interfering;
    not transmitting channel quality indicators of the interfering sub-carrier bands to the base station;
    waiting for a predetermined time period to elapse; and
    transmitting channel quality indicators of the interfering sub-carrier bands to the base station;
    wherein the mobile subscriber receives downlink transmissions from the base station before the predetermined time period elapses.

5. The method of claim 4, transmitting channel quality indicators for sub-carrier bands in a frequency spectrum further comprising:
    transmitting a first channel quality indicator for a first sub-carrier band in the frequency spectrum; and
    transmitting a second channel quality indicator for a second sub-carrier band in the frequency spectrum;
    wherein the mobile subscriber receives downlink transmissions from the base station using the first sub-carrier band, the second sub-carrier band, or both the first and second sub-carrier bands.

6. The method of claim 4, further comprising:
    receiving a downlink transmission from the base station to the mobile subscriber;
    wherein the downlink transmission occurs simultaneously with transmission by the collocated radio.

7. A multiple radio coexistence platform, comprising:
    an 802.16-compliant mobile subscriber to transmit channel quality indicator feedback uplink for a plurality of sub-carrier bands of a frequency spectrum, wherein downlink transmissions to the 802.16-compliant mobile subscriber are based on received channel quality indicator feedback of a plurality of subscribers in a wireless neighborhood, the 802.16-compliant mobile subscriber being one of the plurality of subscribers; and
    a collocated radio, wherein the collocated radio interferes with one or more of the plurality of sub-carrier bands when the collocated radio is turned on;
    wherein the mobile subscriber does not transmit channel quality indicator feedback for sub-carrier bands interfered with by the collocated radio when the collocated radio is turned on and for a predetermined time after, but does transmit channel quality indicator feedback for non-interfered sub-carrier bands.

8. The multiple radio coexistence platform of claim 7, wherein the base station transmission to the mobile subscriber occurs simultaneous with the collocated radio being turned on.

9. The multiple radio coexistence platform of claim 7, wherein the predetermined time exceeds a time for the collocated radio to complete transmission.

* * * * *